United States Patent [19]

Isley, Jr. et al.

[11] Patent Number: 5,391,425

[45] Date of Patent: Feb. 21, 1995

[54] COMPOSITE MATERIAL WITH SHRINKAGE BARRIER

[75] Inventors: Frederick P. Isley, Jr., Tracy; John D. Neuner, West Pittsburgh, both of Calif.

[73] Assignee: Hexcel Corporation, Pleasanton, Calif.

[21] Appl. No.: 922,629

[22] Filed: Jul. 30, 1992

[51] Int. Cl.⁶ ............................................ B32B 3/06
[52] U.S. Cl. .................................. 428/102; 428/234;
  428/240; 428/246; 428/283; 428/284; 428/296;
  428/300; 428/402; 428/406
[58] Field of Search ................ 428/245, 246, 102, 234,
  428/283, 240, 402, 406, 300, 296, 284

[56] References Cited

U.S. PATENT DOCUMENTS

| | | | |
|---|---|---|---|
| 3,515,569 | 6/1970 | Walters et al. | 117/21 |
| 4,180,611 | 12/1979 | Schultheiss et al. | 428/288 |
| 4,428,998 | 1/1984 | Hawkinson | 428/240 |
| 4,543,106 | 9/1985 | Parekh | 51/295 |
| 4,861,649 | 8/1989 | Browne | 428/240 |
| 4,935,294 | 6/1990 | Misevich et al. | 422/246 |

*Primary Examiner*—James J. Bell
*Attorney, Agent, or Firm*—Poms, Smith, Lande & Rose

[57] ABSTRACT

A fiber reinforced composite material and a method for producing the same with a smooth outer surface wherein the shrinkage induced transferring of the fiber reinforcement's pattern to the composite surface is completely or substantially inhibited through the application of a shrinkage barrier which includes uniformly dispersed microspherical particles in a compatible resin matrix.

12 Claims, 1 Drawing Sheet

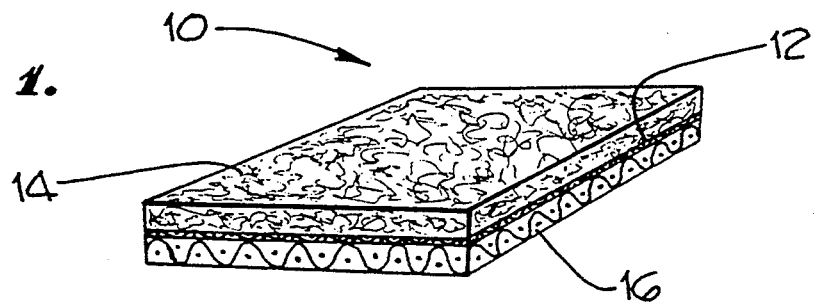
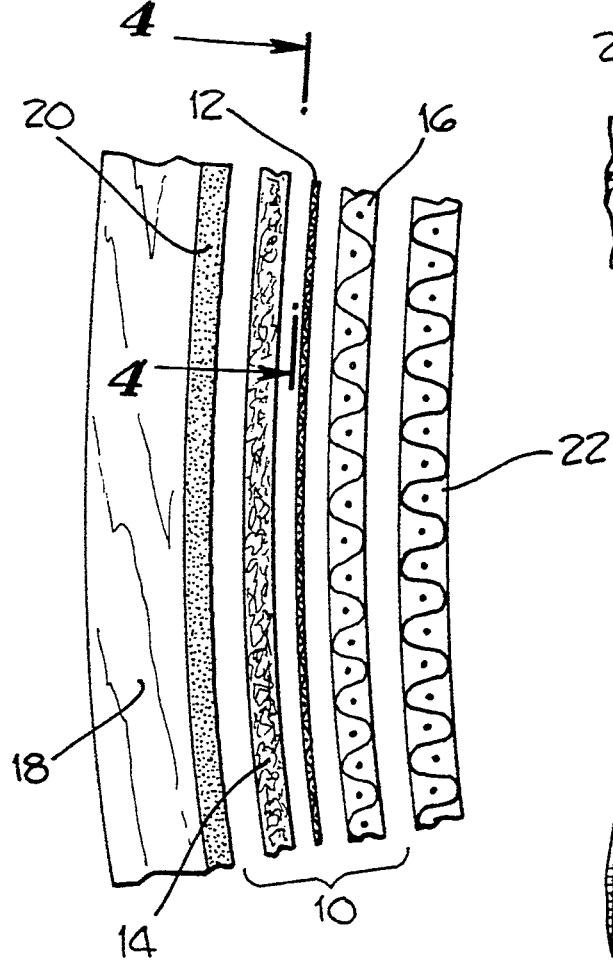
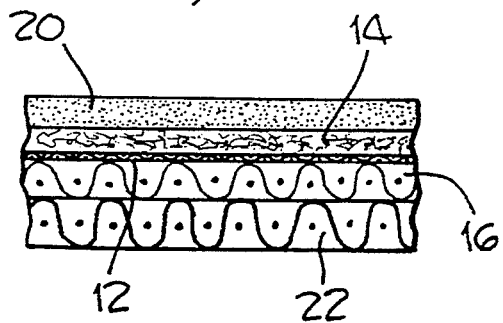
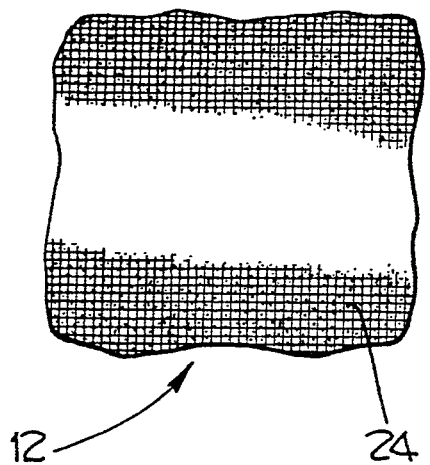

COMPOSITE MATERIAL WITH SHRINKAGE BARRIER

BACKGROUND OF THE INVENTION

1. Field of the Invention

The present invention relates generally to the production of composite materials with smooth, pattern-free surfaces. More particularly, the present invention relates to the use of a shrinkage barrier which is placed just under the surface of the composite material to eliminate or substantially reduce the transfer of fabric patterns from the underlying layers to the composite material surface.

2. Description of Related Art

Fiber-reinforced composite materials include one or more layers of fibers which are located in a resin matrix. The fiber patterns in composite materials range from highly uniform woven fabrics to highly disorganized chopped fibers. During fabrication, the fibers are impregnated with resin and cured to form the final composite material. Sufficient resin is used in forming the composite material so that the fibers are totally immersed in the resin matrix.

In many instances, it is desirable to provide composite materials which have a smooth outer surface. For example, a smooth composite material surface is essential for certain tooling components and a smooth surface is highly desirable for items as boat hulls, architectural facia, signage, automotive trim, recreational vehicle components and a wide variety of other items where a smooth surface is desirable for cosmetic and/or aerodynamic or hydrodynamic reasons.

In many instances, the underlying fiber or core pattern is located close to the resin matrix surface. In these instances, it is difficult to keep the underlying fabric pattern from being transferred to the composite material surface. As a result, the underlying pattern is many times visible on the surface of the composite material. This surface pattern is undesirable for cosmetic reasons in many situations and is undesirable from an engineering standpoint when a smooth surface is required.

Many of the resins used in fabricating composite materials tend to shrink during cure. This shrinkage of the resin exacerbates the above-mentioned problem with respect to fiber pattern transfer to the composite material surface. One attempt to solve this problem has involved using low shrinkage resins. However, this approach has met with limited success since the fiber pattern still tend to be transferred to the composite material surface. Further, these resins are generally brittle and have low impact resistance.

Other attempts to limit pattern transfer include extending cure times for the resins in an attempt to reduce shrinkage and adding a layer of syntactic foam next to the outer surface. Also, low profile fibers have been used in attempts to reduce the visibility of the fiber pattern on the surface. These attempts have met with different degrees of success. However, none of these procedures for eliminating fiber patterns from the composite material surface have been entirely successful.

There presently is a need to provide an efficient, cost effective and reliable way to prevent underlying patterns from being transposed to the composite material surface. The resulting composite material should have a surface which is pattern free and extremely smooth. Further, it is important that the smooth composite material surface be obtained without adversely affecting or otherwise compromising the structural integrity and durability of the composite material.

SUMMARY OF THE INVENTION

In accordance with the present invention, it was discovered that the shrinkage-induced transfer of fiber patterns to the surface of a composite material can be substantially reduced or eliminated by placing a shrinkage barrier between the reinforcement layers and/or cores and the surface of the composite material. The shrinkage barrier includes a layer of filled resin which is composed of microspheric particles embedded in a resin matrix. This filled resin layer provides an effective shrinkage barrier which prevents the underlying fiber pattern from being transposed therethrough. The result is a smooth composite material surface which is free of any fiber pattern.

In accordance with the present invention, a composite material is provided having a composite body which includes a plurality of fibers embedded in a first resin matrix. The composite body has at least one surface where at least a portion of the fibers embedded in the first resin matrix form a fiber pattern having an uneven surface which is located sufficiently close to the surface of the composite body so that the uneven fiber pattern surface is transferred to the surface of the composite body. As a feature of the present invention, a layer of filled resin forms a second resin matrix which is placed between the surface of the uneven resin matrix pattern and the surface of the composite body. The second resin matrix is filled with microspheric particles and is sufficiently thick so that the uneven resin matrix pattern on the composite body surface is not transferred to the outer surface of the filled resin.

As a feature of the present invention, the resin matrix filled with microspheric particles is impregnated into a carrier layer such as a lightweight woven fabric. The resin matrix is made from resins such as epoxy resins, polyamide resins, bismalimide resins, polystyrene resins, polyester resins, styrene soluble resins, acrylic resins, polyurethane resins or blends of the aforementioned resins. This resin matrix is filled with microspheric particles made from plastic, glass, phenolic resin, ceramic or volcanic ash.

As another feature of the present invention, it was discovered that the filled resin layer need only be on the order of 0.001 inch to about 0.020 inch to provide a suitable shrinkage barrier. It was further discovered that filling the resin layer with between about 20% to about 80% by volume microspheric particles produces an especially strong shrinkage barrier which is well-suited for providing a smooth, pattern free surface.

As a further feature of the present invention, a shrinkage barrier is provided which may be transported and layed up in the mold as an integral unit between the gel coat or other surface coating and the reinforcement layers of fabric. The shrinkage barrier includes a layer of resin filled with microspheres which is carried on one or more support layers. An especially suitable shrinkage barrier includes a filled resin layer which is sandwiched between a non-structural layer composed of randomly oriented chopped fiber and a structural layer of woven fabric. This three-layer shrinkage barrier is held together by needle punching, stitch bonding, adhesives or thermal bonding.

As another feature of the present invention, a method is disclosed for using the shrinkage barrier to form a molded composite material. The method involves applying the gel coat or other exterior layer of the composite material to a mold surface. The shrinkage barrier is placed against the gel coat with the non-structural layer contacting the gel coat. A layer of reinforcing fabric is then placed against the shrinkage barrier followed by application and curing of resin to form the composite material. The shrinkage barrier provides a simple and efficient way of reducing the transfer of the pattern from the underlying reinforcement layer to the surface of the gel coat during the molding and curing process.

The above discussed and many other features and attendant advantages of the present invention will become better understood by reference to the following detailed description when taken in conjunction with the accompanying drawings.

BRIEF DESCRIPTION OF THE DRAWINGS

FIG. 1 is a partially schematic cross-sectional view of a preferred exemplary shrinkage barrier in accordance with the present invention.

FIG. 2 is a partial schematic exploded cross-sectional view which shows how the preferred exemplary shrinkage barrier is applied in a molding process.

FIG. 3 is a partially schematic sectional view of a preferred exemplary composite material made using the process exemplified in FIG. 2.

FIG. 4 is a sectional view of FIG. 2 taken in the 4—4 plane to provide a better view of the filled resin layer impregnated on lightweight mesh.

DESCRIPTION OF THE PREFERRED EMBODIMENTS

The present invention has wide application to composite materials in general where it is desired to have a smooth outer surface which is free from fiber patterns. The following description is limited to describing exemplary embodiments wherein fabric patterns of a woven reinforcing fabric are prevented from being transferred to the composite material surface during molding in female molds, vacuum bag molds, resin transfer molds (RTM), structural reaction injection molds (SRIM), closed molds, matched die molds, and similar molding systems. It will be understood by those skilled in the art that the present invention has application to preventing the transposing of random fiber patterns and other surface irregularities in a wide variety of molding operations.

A preferred exemplary shrinkage barrier in accordance with the present invention is shown generally at 10 in FIG. 1. The shrinkage barrier 10 includes a layer of filled resin 12, a non-structural support layer 14 and a structural support layer 16. The filled resin layer 12 includes microspheric particles distributed uniformly therein. The resin layer 12 may be made from any of the well known resins used in fabricating composite materials. These resins include epoxy resins, polyamide resins, bismalamide resins, polystyrene resins, polyester resins, styrene soluble resins, acrylic resins, polyurethane resins or blends of the aforementioned resins. It is desirable that the resin used in layer 12 be compatible with the gel coat and other resins used to form the other parts of the composite material. Preferably, the same resin material will be used throughout the composite material. Resins, such as polyester resins, which are soluble in styrene are preferred. It is important that the resins used in layer 12 be compatible with the other resins used in the composite material to avoid delamination and other problems associated with non-compatible resins.

The layer of filled resin 12 is preferably between about 0.001 to about 0.20 inch thick. The microspheres which are uniformly distributed throughout layer 12 can be made from a variety of materials including plastic, glass, phenolic resins, ceramic, volcanic ash or other low density filling agents which naturally, or as a result of subsequent treatment, are suitable for bonding with the resin used to form layer 12. Preferably, the microspheres will have an average particle diameter of between about 5 to 300 microns.

Preferably, the microspheric particles are hollow, however, the particles may be solid or porous, provided that they are structurally strong. Although spherical particles are preferred, other particle shapes may be utilized such as elliptically-shaped particles or particles with irregular shapes so long as the majority of the particles are smaller in their longest dimension than the thickness of the resin layer in which they are dispersed. In order to provide an adequate barrier to resin shrinkage, the resin layer 12 preferably includes from about 20 to about 80 volume percent of the microspheric particles based upon total layer volume.

Preferably, the filled resin layer 12 includes a lightweight fabric such as a 1080 glass fabric. Preferably, about 50 percent by volume of the filled resin layer 12 will be filled resin with the remainder of the layer being the impregnated lightweight glass fabric. The lightweight glass fabric is designed to provide a carrier for the filled resin. Alternatively, other materials, including porous plastic layers, stitched fabrics or random fiber mats may be used as a suitable carrier for the filled resin.

The filled resin and carrier layer 12 are preferably sandwiched between a non-structural support layer 14 and structural support layer 16. If desired, the filled resin layer 12 may be used by itself; however, it is preferred for transporting and convenience of use that the support layers 14 and 16 be provided. The non-structural support layer 14 is preferably composed of randomly oriented chopped fibers. The chopped fiber mat 14 is a 1 and ½ ounce per foot chopped string mat made with glass fibers. The thickness of the chopped mat 14 is preferably between about 0.001 to about 0.20 inch thick. Other non-structural support mats may be used provided that they do not impart a pattern to the surface of the composite material. If desired, the non-structural mat may be eliminated in certain processes where it is desired that the resin-filled layer 12 be applied directly to the gel coat or other surface coating.

The structural support layer 16 is preferably a stitched glass fabric which is double biased and has a weight of 17 ounces per yard. The structural fabric layer 16 is intended as a support layer for the filled resin layer to insure structural integrity of the resin-filled layer during transport and placement during the molding process. Further, the structural layer 16 provides a transition layer between the filled resin layer 12 and the underlying reinforcement layers. Other structural support layers may be used provided that they have sufficient structural integrity to support the filled resin layer during transport and application during the molding process.

The filled resin layer 12, chopped fiber layer 14 and woven fiber layer 16 may be held together in a variety of ways. Preferably, the three layers are either needle-punched, stitch bonded, thermally bonded or glued together using adhesives. The resulting shrinkage barrier 10 is then transported to the molding site for use in the molding process or stored for future use. The shrinkage barrier 10 is preferably sufficiently flexible so that it can be rolled up into rolls of suitable size and shape for transportation or storage.

FIG. 2 is partially schematic sectional representation of a preferred exemplary use of the shrinkage barrier in accordance with the present invention. A female mold 18 is provided for shaping the outer surface of the composite material. A gel coat 20 is applied to the mold in accordance with standard procedures. Suitable release agents and other conventional mold surface treatments may be used if desired. As is done in conventional molding operations, the gel coat 20 is allowed to partially cure prior to application of subsequent layers of the composite material. In accordance with the present invention, the shrinkage barrier 10 is applied to the gel coat with the non-structural layer 14 contacting the gel coat 20. Preferably, the shrinkage barrier 10 is applied to the gel coat 20 as a single barrier as shown in FIG. 1. However, if desired, the three layers 14, 12 and 16 may be applied sequentially to the gel coat 20. Although the layers 14, 12 and 16 are shown displaced from each other in FIG. 2, it is preferred that these three layers be applied as a single shrinkage barrier.

After the shrinkage barrier 10 is applied to the gel coat 20, the shrinkage barrier 10 is impregnated with resin. After partial curing, one or more reinforcement layers 22 are applied in accordance with conventional composite material lay up procedures. The reinforcement layer 22 is impregnated with resin applied to the part surface and allowed to partially cure prior to application of additional reinforcements layers, if required. Preferably, the shrinkage barrier 10 and reinforcement layer 22 are applied to the gel coat 20 and subsequently resin impregnated together in a single step. Subsequent reinforcement layers are then applied to the partially cured laminant.

The shrinkage barrier 10 in accordance with the present invention is designed to be used in a wide variety of conventional composite material formation processes. The only alteration in the process required in accordance with the present invention is that the shrinkage barrier 10 be located between the gel coat or other surface coating and the underlying reinforcement layers. Various parameters of the shrinkage barrier 10, such as the thickness of the various support layers and filled resin layer along with the degree of loading of the resin with microspheres may be varied depending upon the particular surface coating being used and the type of reinforcing fiber mat being used. In accordance with the present invention the thickness of the layer of filled resin must be sufficiently thick so that the pattern from the underlying reinforcement layer is not transferred to the surface coating in any significant degree.

In FIG. 4, a side view of preferred exemplary resin filled layer 12 is shown. As previously mentioned, the resin filled layer 12 preferably includes a lightweight woven glass fiber carrier layer 24 which is impregnated with the resin having uniformly dispersed therein microspheres as previously described. The filled resin layer 12 may be used alone when desired to provide a shrinkage barrier. However, it is preferred that the non-structural support layer 14 and structural support layer 16 be provided in order to enhance the ease and simplicity with which the shrinkage barrier is transported and applied.

As an example of practice, a resin barrier was constructed utilizing three-quarter ounce per foot chopped glass strand fibers as the non-structural support layer 14. The structural support layer 16 was made from double bias 17 ounces per yard glass fiber. The resin filled layer was made by impregnating 1080 glass fiber mesh with polyester resin containing approximately 50 percent by volume glass microspheres. The glass microspheres had an average diameter of less than about 300 microns. The polyester resin used to impregnate the 1080 glass fiber was uncatalyzed. Sufficient filled polyester resin was impregnated into the 1080 glass fiber so that the resin functioned as an adhesive which was used to bond the chopped fiber mat and double biased woven mat to opposite sides of the filled resin layer. The resulting resin filled layer was composed of approximately 50 percent by volume resin and 50 percent by volume glass fiber. The amount of resin used to impregnate the 1080 glass fiber was not sufficient to penetrate entirely through the two support layers so that the outer surface of the resulting shrinkage barrier remained clean and tackless.

The shrinkage barrier was then used in a conventional polyester resin/fiber glass molding process in a female mold. A catalyzed gel coat was applied to the mold after application of an appropriate release agent. The gel coat was approximately 0.030 inch thick and was allowed to cure for approximately one hour until it was tacky. The previously prepared shrinkage barrier was then applied to the gel coat with the chopped strand mat being pressed against the gel coat to achieve a uniform bond. Catalyzed polyester resin was applied to the gel coated laminate and impregnated into the shrinkage barrier and allowed to partially cure. When the shrinkage barrier became tacky, a reinforcement layer of glass fiber woven roving having a weight of 24 ounces per yard was applied to the shrinkage barrier. Catalyzed polyester resin was then applied to the reinforcement layer. The entire assembly was allowed to completely cure prior to removal from the mold. A visual inspection of the gel coat surface of the composite material showed no visible transfer of the reinforcement mat pattern to the surface of the gel coat.

A composite material was made following the same procedure set forth above except that the shrinkage barrier was not placed between the gel coat and the reinforcement layer of woven roving. After final cure, visual inspection of the gel coat showed observable transfer of the pattern from the underlying reinforcement layer to the gel coat.

Having thus described exemplary embodiments of the present invention, it should be noted by those skilled in the art that the disclosures herein are exemplary only and that various other alternations, adaptions and modifications may be made within the scope of the present invention. Accordingly, the present invention is not limited to the specific embodiments as illustrated herein.

What is claimed is:

1. An article comprising:
    a composite body having a surface, said composite body comprising a plurality of fibers embedded in a first resin matrix wherein at least a portion of said fibers embedded in said first resin matrix form a fiber pattern, said fiber pattern being located sufficiently close to the surface of said composite body so that said fiber pattern is transferred to said surface; and a layer of filled resin comprising microspheric particles embedded in a second resin matrix, said layer of filled resin having an interior located on said composite body surface and an exterior surface which defines the surface of said article, wherein said layer of filled resin is sufficiently thick so that the fiber pattern is not transferred to the exterior surface of said layer of filled resin.

2. An article according to claim 1 wherein said layer of filled resin further comprises a carrier layer which is impregnated with said microspheric particles embedded in said second matrix.

3. An article according to claim 2 wherein said carrier layer comprises woven fabric.

4. An article according to claim 2 wherein said composite body comprises a gel coat layer which forms the surface of said composite body.

5. An article according to claim 4 wherein said article further comprises a layer of randomly oriented, chopped fibers located between said gel coat and said layer of filled resin.

6. An article according to claim 1 wherein said layer of filled resin has a minimal deleterious effect on the mechanical properties of said composite in a flexural or through plane testing mode.

7. An article according to claim 1 wherein said microspheric particles in said layer of filled resin consist essentially of a material selected from the group consisting of plastic-glass, phenolic resin, ceramic and volcanic ash.

8. A shrinkage barrier adapted for use in preventing the uneven pattern of a structural fiber layer from being transferred to the surface of an article in which said structural fiber layer is located, said shrinkage barrier comprising:
a layer of filled resin comprising microspheric particles embedded in a resin matrix; and
one or more support layers located on one or both sides of said layer of filled resin, said layer of filled resin and said one or more support layers being held together by needle punching, stitch bonding, thermal bonding, or adhesive bonding.

9. A shrinkage barrier according to claim 8 wherein said support layers comprise:
a non-structural layer comprising randomly oriented chopped fibers located on one side of said layer of filled resin; and
a structural layer comprising a woven fabric located on the other side of said layer of filled resin.

10. A shrinkage barrier according to claim 8 wherein said layer of filled resin further comprises a carrier layer which is impregnated with said microspheric particles embedded in said resin matrix.

11. A shrinkage barrier according to claim 10 wherein said carrier layer comprises woven fabric.

12. A shrinkage barrier according to claim 8 wherein said microspheric particles in said layer of filled resin consist essentially of a material selected from the group consisting of plastic, glass, phenolic resin, ceramic and volcanic ash.

* * * * *